J. F. MacKAY.
BRODER.
APPLICATION FILED MAR. 20, 1916.
1,244,111.
Patented Oct. 23, 1917.
2 SHEETS—SHEET 1.
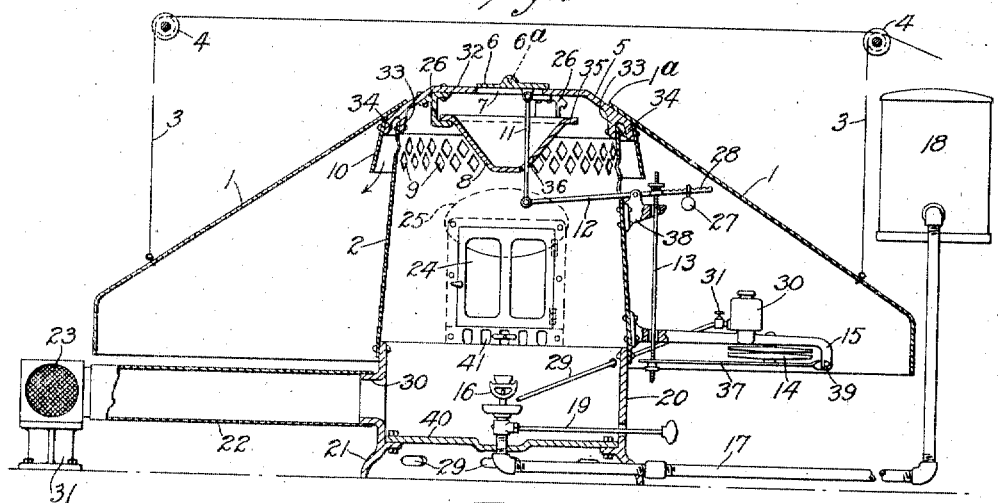
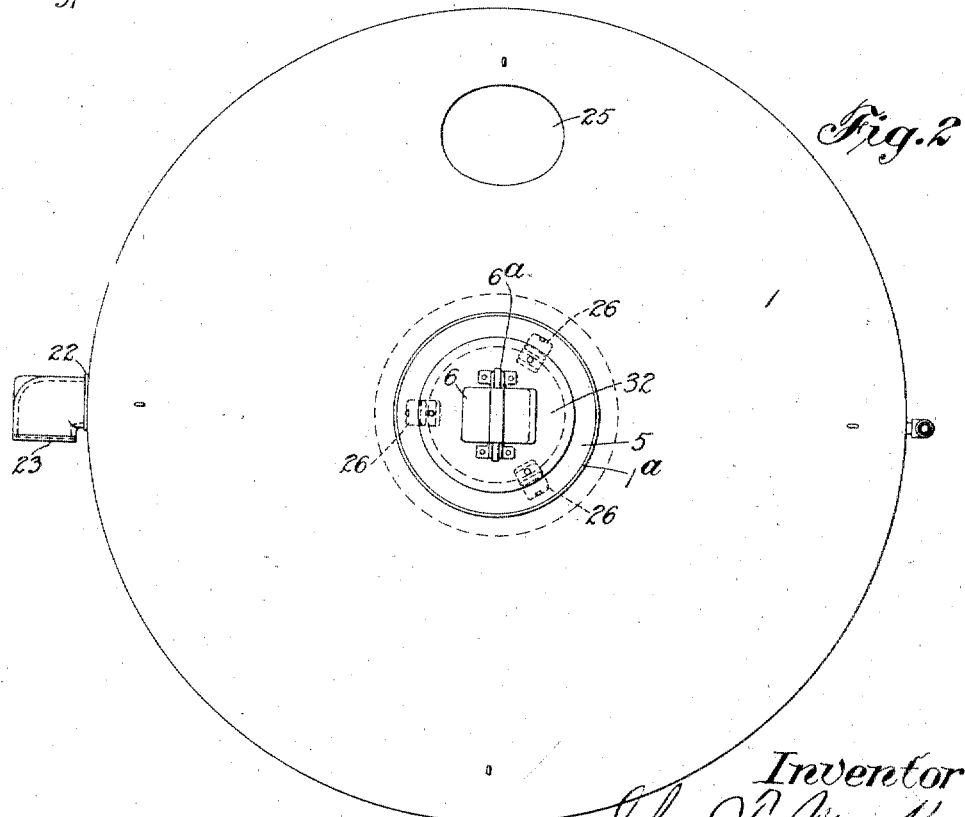
Inventor
John F. MacKay,
per Fred E. Fisker.
Atty.

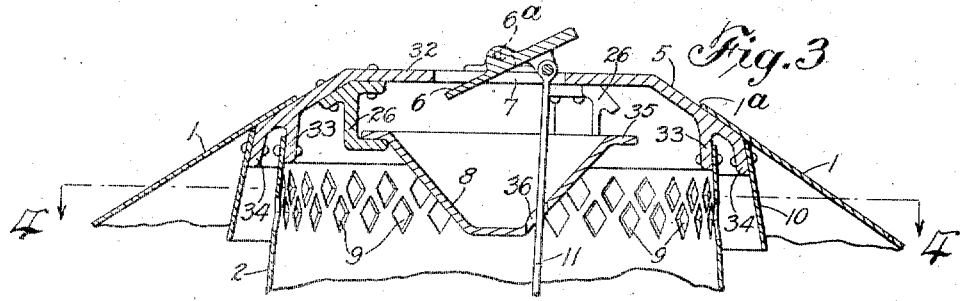
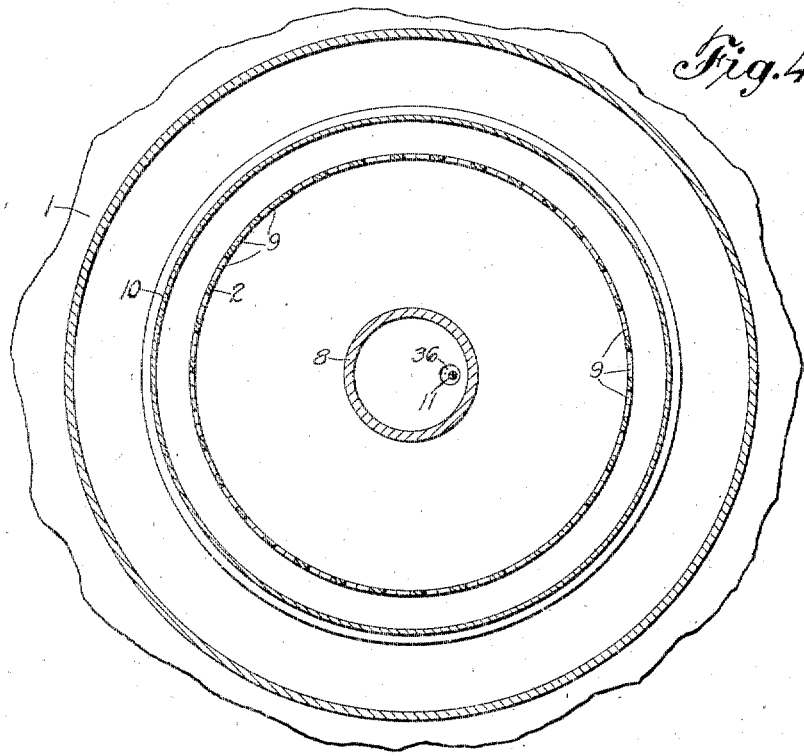

UNITED STATES PATENT OFFICE.

JOHN FREEMAN MACKAY, OF BORDENTOWN, NEW JERSEY.

BROODER.

1,244,111.   Specification of Letters Patent.   Patented Oct. 23, 1917.

Application filed March 20, 1916. Serial No. 85,373.

*To all whom it may concern:*

Be it known that I, JOHN FREEMAN MAC-KAY, a citizen of the United States, residing at Bordentown, in the county of Burlington and State of New Jersey, have invented certain new and useful Improvements in Brooders, of which the following is a specification, reference being had therein to the accompanying drawing.

My present invention refers to various useful and novel details in the construction of brooders or hovers for use with infant poultry and other birds, especially newly-hatched chicks which must be protected from chilling drafts and kept in a uniform and stable temperature. The object of the invention is to provide a simple, efficient, and economical mechanical combination by which heat can be generated easily and inexpensively, and the temperature of which will be automatically controlled, the air kept pure, and quick access to all the parts be easily had. The invention, therefore, may be said to comprise a brooder of the construction described and claimed wherein the heating means consists preferably of a gas or oil burner, the whole combination having a removable and adjustable hood, a cold air supply, an anti-draft arrangement of parts, and other useful and effective appurtenances, together with various details and peculiarities in the construction, combination and arrangement of the parts, substantially as will be hereinafter described and then more fully pointed out in the claims.

In the accompanying drawing illustrating my invention:

Figure 1 is a vertical section of my improved brooder;

Fig. 2 is a top plan view;

Fig. 3 is an enlarged section of the upper part of the brooder as it is represented in Fig. 1, but with the top damper open;

Fig. 4 is a horizontal cross-section on the line 4, 4 of Fig. 3.

Similar characters of reference designate corresponding parts throughout the different figures of the drawing.

1 denotes a conical hood designed to surround the heating means and provide a brooder chamber under which the chicks may be hovered as under the wings of a hen, said hood spreading outwardly more or less from its center so as to make the chamber thereunder larger or smaller, and having its outer peripheral edge raised a convenient distance from the floor so as to provide easy passage to and fro for the chicks or other poultry or birds. The conical upper end of the hood 1 has a circular opening 1ª and the part of the hood surrounding this opening rests loosely upon the correspondingly-beveled side of a top casting 5 which is supported on a central cylindrical heating drum 2 carried by a bottom circular frame 20 having a foot ledge or feet 21 resting on the floor of the colony house or other surface where the brooder may be placed. The hood 1 can be raised and lowered by means of cables 3 running over pulleys 4, which cables may be manipulated or operated in any desired way for the purpose of lifting the hood 1 off the casting 5 and above the heating means so that the interior of the brooder chamber can be reached for any purpose. Ordinarily the hood 1 rests loosely upon the top casting 5 in the way I have explained. This hood 1 is further provided with a peep hole or hand hole 25 to allow investigation of its interior when it is in use.

The cylindrical base 20 provides inside thereof a burner chamber, in which is situated a burner 16, which is of any suitable type and designed for use with any kind of gas or oil. I preferably employ a burner which vaporizes oil into gas, the oil being received through a pipe 17 running from a supply can 18. The detailed construction of the burner is not set forth here as it forms no part of the present invention, and inasmuch as I can employ various kinds of burners. Burner 16 is provided with a cock 19 having a handle projecting out through an opening in the wall of the base 20 where it may be conveniently operated, said handle being used to open and shut the valve that controls the supply of oil to the burner. The base 20, as stated, is supported on the foot flange 21 and is preferably provided with a series of openings 29 through which fresh atmospheric air enters the space below the plate 40 which is secured at its edges to the inner wall of base 20 and which holds the burner 16 in position. The fresh air entering through holes 29 keeps the adjacent parts from becoming overheated.

Furthermore, a supply of fresh outside pure air is constantly given to the base 20, its burner 16, and the drum 2, through a pure air supply pipe 22 running from a point outside of the chamber formed by the hood 1, said pipe 22 being connected to a boss 30 on the side of frame 20 and being supported at its outside end by a foot 31, said outside end of the pipe 22 being provided with a covering 23 of gauze netting, or some other fine mesh, which, while it permits the entrance of the air, keeps out the dust and dirt and foreign particles, and allows pure air to be introduced into the device.

Within the center of the brooder and bolted to the base 20 is a cylindrical drum 2 of sheet or cast metal or any other material and of suitable diameter, the casting 5 already mentioned being bolted to the top of said drum 2. Casting 5 has a flat top 32 and an inclined ring portion below said top which is flared at any convenient angle and which supports loosely thereon the apertured top of the hood 1, as I have already explained, said inclined ring portion of the casting 5 having two downwardly-projecting flanges, an inner one 33 and an outer one 34, the flange 33 being riveted or otherwise bolted to the upper peripheral edge of the drum 2, as already stated, while the outer flange 34, which is directly below the inner surface of the hood 1, carries a cylindrical ring 10 riveted or otherwise firmly secured thereto, and constituting a shield or deflector which projects downwardly alongside of the outer wall of the drum 2 at a certain distance therefrom, thus forming therewith an annular space through which the heated air which emerges from the drum 2 through openings 9 is deflected downwardly into the interior of the chamber within the hood 1. This shield or deflector 10 therefore covers the openings 9 and causes the draft to be downward alongside of the outer surface of the drum 2 instead of outwardly into the chamber within hood 1, so that there are no disastrous currents swirling throughout the brooder chamber to the injury of the chicks or birds. There may be any number of these openings 9, which may be staggered or otherwise, the object being to allow the heated air within the drum 2 to pass out through said openings into the chamber under hood 1. Furthermore, referring to the specific construction of the top casting 5 it will be noted that it has a central opening 7, in connection with which is arranged a damper 6, preferably heavier on one side than on the other side, so that it may be closed readily when the lifting agency is removed, which agency consists of a link or arm 11 pivoted to the inside of the heavier portion of the valve or damper and operated automatically by a thermostatic appliance in a manner to be presently described. This damper 6 is supported on a pivot 6'. When the damper is open, the hot air finds exit from the brooder through opening 7, but when it is closed this hot air will pass into the brooder chamber through openings 9.

In the upper interior of the chamber within the drum 2 is a deflector or distributer 8, having the general form of an inverted cone and consisting of an integral casting having at its upper periphery an encircling horizontal flange 35 which rests loosely upon hangers or brackets 26 that are riveted or bolted to the top casting 5, there being any suitable number of these hangers 26, as for example, three, as shown in Figs. 1, 2, and 3. As the conical distributer 8 is thus loosely supported it can be readily removed when desired and its position can be changed. It preferably is provided with an opening 36 large enough to allow the stem 11 for the damper 6 to pass therethrough with room for easy movement. The air heated by the flame from the burner 16 rises rapidly to the top of the drum 2 and strikes against the deflector 8 which spreads it laterally and causes it to issue from the drum through the openings 9 into the annular space between the deflector 10 and the drum 2 and thus to be shunted by deflector 10 downwardly into the brooder chamber.

On the outside of the drum 2, and in the chamber under the hood 1, is a bracket 15 which supports a thermostat 14 consisting of the usual expansible devices that are acted upon by heat for expanding them and which contract as they cool. Said thermostat 14 operates a lever 37 connected to a vertical rod 13 which in turn actuates a lever 12 pivoted on a fulcrum 38 on the side of the drum 2, said lever 12 being pivoted to the link 11 which serves as an operating stem for the damper 6. The link 12 at a point beyond its fulcrum is notched at 28, the notched portion being provided with an adjustable counterbalance 27 which will assist in opening the damper 6 when the time comes for such action. Obviously the expansion of the thermostat 14 will move the free end of the lever 37 downwardly, turning it on its pivot 39 in the end of the bracket 15, and this action of the lever 37 will pull downwardly on the rod 13 and vibrate the lever 12 on its pivotal support 38, and thus cause the stem 11 to lift upwardly on the heavy part of the valve 6 and turn the latter on its pivot 6' for the purpose of opening the damper. When the heat within the drum 2, therefore, reaches such a degree that the air in the brooder chamber is also of sufficiently high temperature to expand the thermostat 14, it will be obvious that the damper or outlet valve 6 will be opened so that the hot air will ascend to the very top of the drum 2 and pass out through the opening 7 instead of going through the lateral openings 9. In this way I am able to get rid of the over-heated air and keep the temperature within the brooder at a uniform point, for the temperature will immediately begin to equalize when the damper 6 is open, and a reduction of the temperature will ensue sufficiently to cool the thermostat and cause it to contract enough to allow the damper 6 to close by virtue of the action of its heavy side overcoming the lifting agency of the levers already described.

Access is had to the interior of the drum 2 through the door 24 which is supported by suitable hinges and covers an opening in the wall of the drum 2. Below the door 24 there is a suitable ventilator 41 which can be opened or closed at will and which provides an additional air supply or cuts it off, and thus promotes the circulation of air. It will be perceived, therefore, that the whole brooder is capable of operating so that the temperature is completely under control at all times and is kept uniform and satisfactory. The supply of pure air which is constantly flowing into the drum 2 through the pipe 22 is heated by the burner, and this heated air fills the drum 2 and is delivered through the lateral openings therein into the chamber under hood 1 until the same is heated hot enough for its purpose. When there is any increase of temperature above the predetermined amount, the thermostat opens the discharge outlet at the top of the drum 2 and allows the excess heat to be gotten rid of, which will restore the temperature to normal. I may also refer to the fact that the bracket 15 that carries the thermostat also supports a small can 30 of kerosene, alcohol, or other inflammable fluid which flows therefrom through a pipe 29 controlled by a valve 31 to a priming cup arranged in connection with the burner 16 so that the oil-containing parts of said burner may be heated sufficiently to cause vaporization of the oil whenever it is desired to light the gas issuing from said burner and start the device in operation. Furthermore, it will be noted that the impurities which fall with the air to the floor and might otherwise prove deleterious to the chicks could be drawn through the openings 29 in the foot flange 21 and caused to pass upwardly through drum 2 and be discharged through the outlet 7 when the latter is open if plate 40 is removed.

Many changes in the precise construction, arrangement, and adaptation of the various parts may be made without going beyond the scope of the appended claims, and I, therefore, reserve the liberty of modifying the embodiment of the invention in a great variety of practical ways to the end that the best results may be attained in service.

Having thus described my invention, what I claim as new and desire to secure by Letters Patent, is:—

1. In a brooder, the combination of a central main heating drum having lateral openings for the passage of heated air, a base frame on which the drum is mounted, a heater in said base, a pure air supply pipe entering said base, a valve-provided casting supported upon the upper end of said drum, and carrying a ring surrounding the drum opposite the lateral air outlets for deflecting the air downwardly, an apertured hood loosely hung on the top casting and provided with means for raising and lowering it, an inner cone-shaped deflector opposite the said lateral outlets, means on the top casting for supporting said deflector, and a temperature control device within the hood for actuating the valve in the upper casting.

2. In a brooder, the combination of a central main drum having outlet openings near the upper end for the passage of heated air, a base on which the drum is mounted, a burner therein, a pure air supply entering the base, a casting on the upper end of the drum, a valve arranged in an opening in said casting, a hood supported on said casting, a ring carried by the casting and surrounding the drum opposite the air outlets for deflecting the air downwardly, and an inner deflector opposite the said lateral outlets, together with means on the upper casting for loosely carrying said deflector.

3. In a brooder, the combination of a central drum having lateral openings for the passage of heated air, a top casting carried on said drum, a central valve pivotally arranged in an opening in said casting, an internal deflecting device opposite said lateral openings consisting of an inverted cone for diverting the air outwardly, means for loosely supporting said deflector upon the top casting, a ring surrounding the drum and supported from the top casting at a point opposite the lateral openings for deflecting the air downwardly and preventing drafts, an apertured hood loosely hung on the top casting, means for supplying pure cool air to the device, a burner, and a temperature control device within the hood for actuating the valve in the upper casting.

In testimony whereof I affix my signature.

JOHN FREEMAN MACKAY.